Aug. 19, 1924.

H. C. MAUL 1,505,273

HOTEL OVEN CONSTRUCTION

Filed April 19, 1923   3 Sheets-Sheet 2

Inventor
Henry C. Maul
By
Attorney

Aug. 19, 1924.

H. C. MAUL

HOTEL OVEN CONSTRUCTION

Filed April 19, 1923   3 Sheets-Sheet 3

1,505,273

Inventor
Henry C. Maul,
By
Attorneys

Patented Aug. 19, 1924.

1,505,273

UNITED STATES PATENT OFFICE.

HENRY C. MAUL, OF DETROIT, MICHIGAN, ASSIGNOR TO THE MICHIGAN STOVE COMPANY, OF DETROIT, MICHIGAN, A CORPORATION OF MICHIGAN.

HOTEL-OVEN CONSTRUCTION.

Application filed April 19, 1923. Serial No. 633,097.

*To all whom it may concern:*

Be it known that I, HENRY C. MAUL, a citizen of the United States of America, residing at Detroit, in the county of Wayne and State of Michigan, have invented certain new and useful Improvements in Hotel-Oven Construction, of which the following is a specification, reference being had therein to the accompanying drawings.

The kitchens of large hotels, clubs and restaurants are often equipped with large oven structures, one oven above the other, in a unitary structure having separate oven compartments, burners for each oven compartment, and a door for each compartment, such doors being let-down or of the usual hinge type for access to the oven compartments. The doors are often opened partially to cool off the double oven or retard baking therein, and I find, after inspecting many installations, that either the upper or lower oven is not used, generally the latter, because the manner of using the lower oven prevents perfect operation of the upper oven, and since the upper oven is more convenient, it is used in preference to the lower oven, which becomes practically useless. I find the trouble lies in the practice of opening the lower oven door, permitting heated oxygen exhausted air to escape from the lower oven right in the path of the primary air supply to the burners of the upper oven, and since warmed burned air and cold gas do not afford a proper or perfect combustion, the burners of the upper oven do not function properly—consequently poor baking. The chefs or cooks therefore discontinue to use the lower oven in order to obtain good results with the upper oven. I find this defect can be remedied, so the object of this invention is to provide means to prevent the operation of one oven from interfering with the operation of an adjacent oven. To do this, I first partition off, shield or inclose the air mixers of the upper oven burners, and second, provide an independent source of air for such burners. In partitioning off the air mixers of the upper oven burners, I prevent any heated and burned air, escaping or radiating from the lower oven burners, from being drawn in or entering such air mixers, and since I provide a remote source of air for the upper oven burners, proper combustion is assured. It is therefore obvious that the lower oven can be used, simultaneously with the upper oven, as intended, without destroying or interfering with perfect baking in the upper oven.

The construction which I employ to accomplish the above results will now be described in connection with superposed ovens and by aid of the drawings wherein:—

Figure 1:
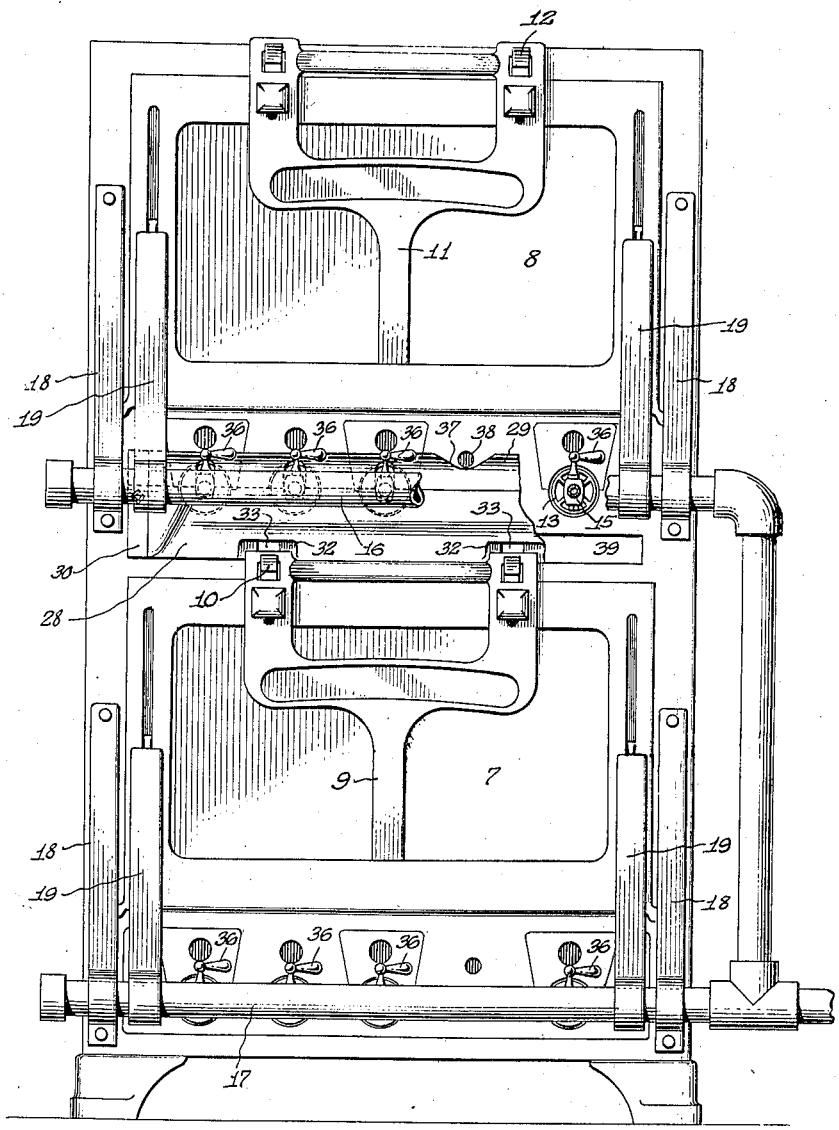
Figure 1 is a front elevation of a hotel oven structure in accordance with my invention.

The hotel oven structure which I have illustrated may be arranged in battery formation with other oven structures and each structure includes a lower oven 1 containing burners 2 and an apertured oven bottom 3. Above the lower oven 1 is an upper oven 4 containing burners 5 and an apertured oven bottom 6. The doorways of the ovens 1 and 4 are normally closed by bottom hinged or pivoted let-down doors 7 and 8, the door 7 having a slidable latch member 9 to engage keepers 10 on the front wall of the oven structure, and the door 8 has a slidable latch member 11 to engage keepers 12 at the top of the oven structure.

Figure 2:
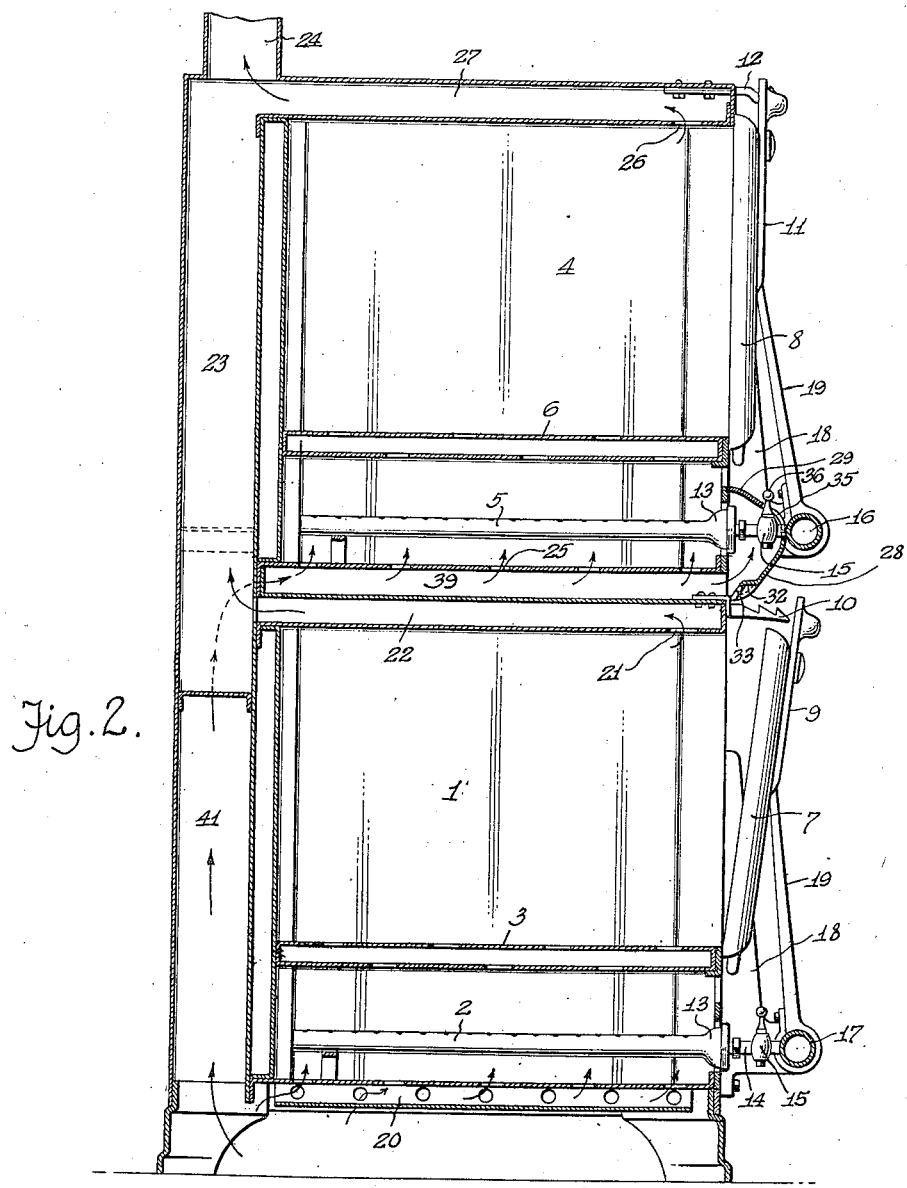
Fig. 2 is a vertical longitudinal sectional view of the same, showing the lower oven door partly open.

The burners 2 and 5 have air mixers 13 into which extend the jets 14 of valves 15, said valves being connected to gas supply pipes 16 and 17 supported in brackets 18 on the front wall of the oven structure. The gas supply pipe 16 is connected to the gas supply pipe 17 and these gas supply pipes are provided with pivoted supports 19 in sliding engagement with the doors 7 and 8 so that said doors may be safely supported in open positions or, as illustrated in Fig. 2 in connection with the lower oven 1, in a partially open position. As pointed out in the beginning, it is common practice to open the oven doors, but partially, to permit the ovens to cool or to regulate baking.

The lower oven 1 receives air through the apertured bottom 20 of the casing and said oven is ventilated by a series of exhaust openings 21, a horizontal flue 22 and a rear vertical flue 23 to the exhaust stack or chimney 24 of the oven structure.

The upper oven 4 receives air through an apertured bottom wall 25 and said upper oven is ventilated by a series of exhaust openings 26 opening into a top flue 27 communicating with the stack or chimney 24.

Figure 3:
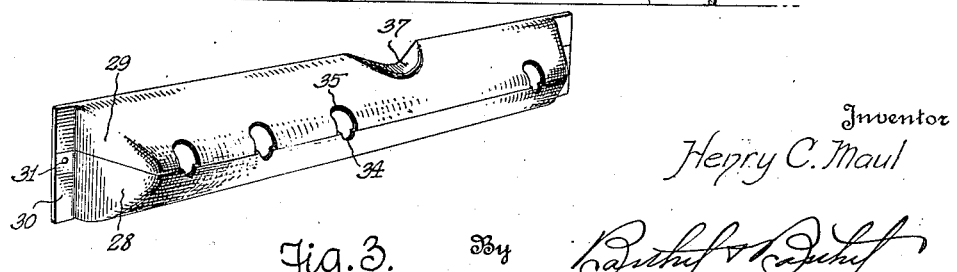
Fig. 3 is a perspective view of a detached sectional or two-part casing forming part of my invention.
Figure 4:
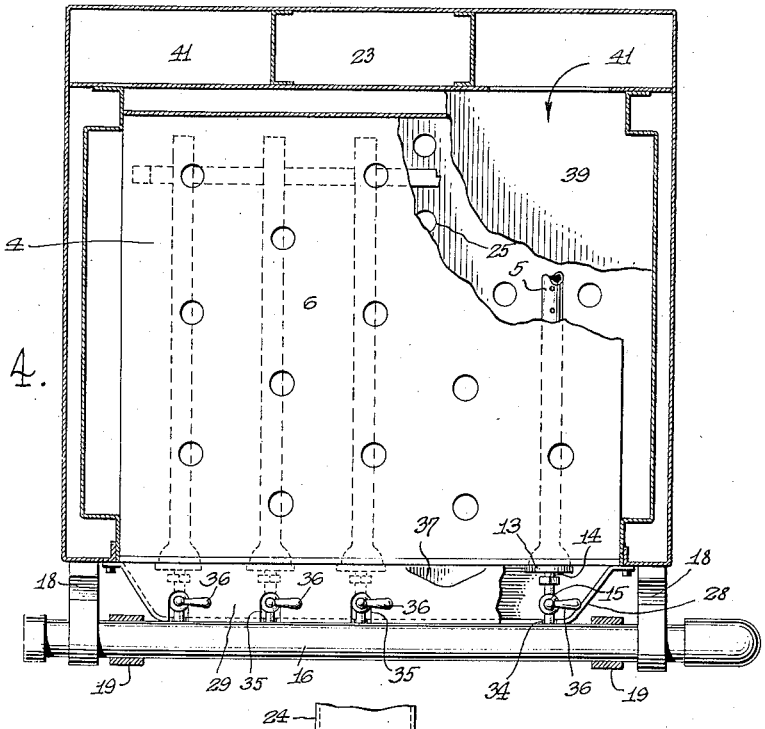
Fig. 4 is a horizontal sectional view of the upper oven, partly broken away.

Thus far I have described an oven construction which may be considered more or less conventional and of that type used in the kitchens of large hotels. If the door 7 of the lower oven 1 is opened but partially, as shown in Fig. 2, the heated or burned air escaping from the lower oven 1 is deflected upwardly by the door 7 in front of the air mixers 13 of the upper burners 5, and is consequently drawn into the burners to commingle with the gas supplied thereto. The warm burned air and the cold gas do not mix well for combustion purposes, therefore poor combustion within the upper oven 4. Under such conditions the upper oven does not bake or roast as desired and to improve this condition a chef or cook will discontinue to use the lower oven 1, because the upper oven is more convenient to use than the lower oven. In order that the use of the lower oven may not interfere with the operation of the upper oven I isolate or shield the supply of air to the upper burners 5 from any heated air that may be emitted at the doorway of the lower oven 1. This is accomplished by two changes or additions to the usual form of double or superposed ovens. First, I mount a sectional or two-part casing or shield about the valves 15 and in front of the air mixers 13 of the upper burners 5. The casing, as best shown in Fig. 3, comprises two oblong members 28 and 29 placed in abutting relation, the member 28 having end flanges 30 adapted to be fastened to the front wall of the oven structure by stove bolts 31 or other fastening means so that the member 28 will be stationary under the valves 15 of the upper burners. The lower part of the casing member 28 is recessed, as at 32 to provide clearance for the latch member 9 of the lower oven door 7, also slotted, as at 33 to provide clearance for the keepers 10 when mounting the casing member 28 up under the upper valves 15, said casing member having its upper edge notched or recessed, as at 34 to receive the valve connections at the gas supply pipe 16, as best shown in Figs. 2 and 4.

The upper casing member 29 is detachably mounted on the upper edges of the casing member 28 against the front wall of the oven structure and said upper casing member 29 is provided with openings 35 for the handles and stems 36 of the upper valves 15, and in addition to the openings 35 there is a depressed or recessed portion 37 adjacent the pilot opening 38 in the front wall of the oven structure.

Figure 5:
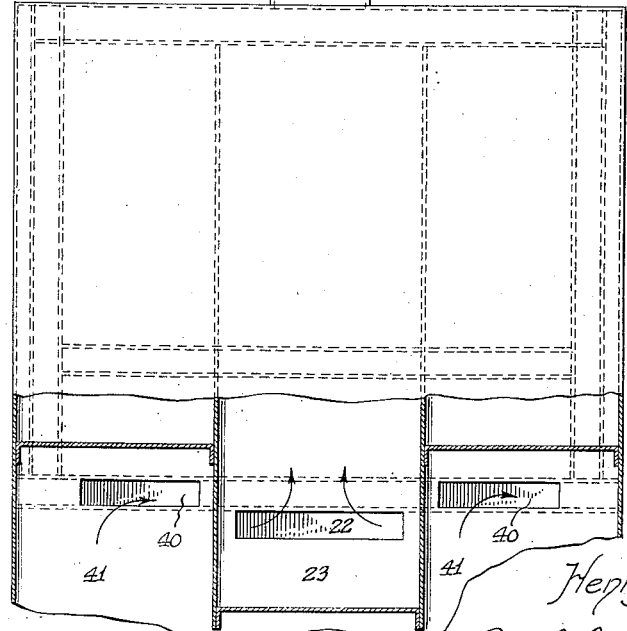
Fig. 5 is a rear elevation of a portion of the oven structure partly in vertical section.

Supplying air to the casing members 28 and 29 is a wide horizontal flue 39, between the top wall of the flue 22 and the apertured bottom wall 25 of the upper oven 4 and from which flue the upper oven 4 receives fresh air. The rear wall of the flue 39 has two openings 40 communicating with vertical flues 41 at the rear wall of the oven structure, the said vertical flues 41 having the lower ends thereof open at the bottom of the oven structure. By reference to Fig. 5 it will be noted that the smoke or exhaust flue 23 has its lower end closed in a plane below the upper closed ends of the air intake flues 41, and the flue 41 merge into a wide air intake passage at the lower part of the oven structure.

By reference to Fig. 2 it will be noted that the lower oven door 7 may be left ajar without any danger of the heated or burned air from the oven doorway entering the casing about the upper valves 15 and consequently the lower oven 1 can be operated in the usual manner without interfering with the operation of the upper oven 4. This upper oven will receive its air from the rear part or bottom of the oven structure and the same source of air serves the air mixers of the upper burners by reason of the casing communicating with the forward end of the flue 39. The arrangement of the casing about the valves 15 does not interfere with the operation of said valves nor prevent adjustment of the air mixers, for the reason that the casing member 29 may be easily removed.

My invention is susceptible to such structural changes as are permissible by the appended claims.

What I claim is:—

1. In an oven structure wherein superposed ovens each have a door with burners in the oven and said burners provided with air mixers and valves, the air mixers of the upper oven being in proximity to the doorway of the lower oven and liable to receive heated air therefrom:—means isolating the source of air for the air mixers of the upper oven from that which may be emitted at the doorway of the lower oven, said means inclosing the air mixers of the upper oven and receiving air at a point remote from the doorway of the lower oven.

2. An oven structure as called for in claim 1, wherein said means includes a two-part casing, one part of which is detachable.

3. An oven structure as called for in claim 1, wherein said means includes a casing receiving air from a flue between the superposed ovens.

4. An oven structure as called for in claim 1, wherein said means includes a casing receiving air from flues, one between the upper and lower ovens communicating with a flue behind the lower oven.

5. An oven structure comprising upper and lower ovens, said oven structure having an exhaust flue communicating with the top of each oven, said lower oven receiving air from the bottom of said structure, said upper oven receiving air from behind said lower oven, burners for each oven having air inlets, and a casing inclosing the air inlets of the burners of the upper oven and receiving air from behind the lower oven.

6. An oven structure as called for in claim 5, wherein the casing is composed of a stationary member serving as an air deflector, and a detachable member seated on said stationary member.

7. An oven structure comprising upper and lower ovens, said oven structure having an exhaust flue communicating with the top of each oven, said lower oven receiving air through the bottom thereof, burners for each oven having air inlets, a valve for each burner, a gas supply pipe connecting the burner valves of each oven, and a casing inclosing the air inlets of the upper oven burners, said casing engaging the front wall of the oven structure and extending between the burner valves and the gas supply pipe connected thereto.

8. An oven structure including upper and lower ovens provided with burners, and said oven structure having a horizontal flue between said ovens receiving air at the rear end thereof and having its front end inclosed to supply air to the burners of the upper oven independent of any source of air in front of said oven structure.

9. In a double oven, one oven above the other, the lower oven having a door opening and a door for closing the door opening, a burner in the lower oven, a burner in the upper oven having an air mixer situated immediately above the door opening of the lower oven, and means to prevent the products of combustion from the lower oven burner from exerting a disturbing effect on the air mixer of the upper oven burner when the lower oven door is open.

10. In a double oven, one oven above the other, burners for each oven, air mixers on the burners, and a shield to prevent the products of the lower oven from interfering with the air intake of the burners of the upper oven, when lower oven door is open.

In testimony whereof I affix my signature in presence of two witnesses.

HENRY C. MAUL.

Witnesses:
CHARLES W. STAUFFIGER,
KARL H. BUTLER.